(12) United States Patent
Narayanamurthy

(10) Patent No.: US 9,571,287 B2
(45) Date of Patent: Feb. 14, 2017

(54) SECURE PROOFS OF STORAGE FOR DEDUPLICATION

(71) Applicant: NetApp, Inc., Sunnyvale, CA (US)

(72) Inventor: Srinivasan Narayanamurthy, Chennai (IN)

(73) Assignee: NETAPP, INC., Sunnyvale, CA (US)

( * ) Notice: Subject to any disclaimer, the term of this patent is extended or adjusted under 35 U.S.C. 154(b) by 187 days.

(21) Appl. No.: 14/491,750

(22) Filed: Sep. 19, 2014

(65) Prior Publication Data

US 2016/0077977 A1    Mar. 17, 2016

Related U.S. Application Data

(60) Provisional application No. 62/051,080, filed on Sep. 16, 2014.

(51) Int. Cl.
| | |
|---|---|
| *H04L 9/32* | (2006.01) |
| *G06F 3/06* | (2006.01) |
| *G06F 21/62* | (2013.01) |
| *G06F 21/64* | (2013.01) |
| *H04L 29/08* | (2006.01) |
| *H04L 29/06* | (2006.01) |

(52) U.S. Cl.
CPC ............ *H04L 9/3242* (2013.01); *G06F 3/06* (2013.01); *G06F 21/6218* (2013.01); *G06F 21/64* (2013.01); *H04L 63/123* (2013.01); *H04L 67/1097* (2013.01); *H04L 2209/24* (2013.01)

(58) Field of Classification Search
None
See application file for complete search history.

(56) References Cited

U.S. PATENT DOCUMENTS

| | | | |
|---|---|---|---|
| 8,528,085 B1 * | 9/2013 | Juels | G06F 21/80 726/22 |
| 9,223,789 B1 * | 12/2015 | Seigle | G06F 17/30073 |
| 2011/0016152 A1 * | 1/2011 | Popovski | G06F 3/0608 707/797 |
| 2015/0058301 A1 * | 2/2015 | Kolodner | G06F 17/30156 707/692 |

OTHER PUBLICATIONS

Coelho, "An (Almost) Constant-Effort Solution-Verification Proof-of-Work Protocol based on Merkle Trees (extended and colored version of [7])", 2014, 8 pages.
Yang, et al., "Provable Ownership of File in De-duplication Cloud Storage", Globecom 2013, 2013, 6 pages.

* cited by examiner

*Primary Examiner* — Michael R Vaughan
(74) *Attorney, Agent, or Firm* — Cooper Legal Group, LLC

(57) ABSTRACT

Storage providers can securely store data and avoid data duplication with secure derivative data and offload the responsibility of generating the secure derivative data to the data owners. Initially, a data source will provide an encrypted version of data and the secure derivative data to a remote storage provider. The secure derivative data can include a hash of the data, a hash of the encrypted version of the data, a hash tree generated from the data, and an encrypted version of the key used to encrypt the data. When the remote storage provider later receives a request to store the same data, the remote storage provider uses the secure derivative data for secure proofs of storage and for proof of data possession.

20 Claims, 6 Drawing Sheets

SECURE PROOFS OF STORAGE FOR DEDUPLICATION

BACKGROUND

This disclosure generally relates to the field of data storage, and, more particularly, to reducing data duplication in storage.

To efficiently store date, remote storage providers employ data deduplication. Instead of maintaining separate copies of a large chunk of data (e.g., a file or section of a large file), data deduplication eliminates duplicates and references the large chunk of data from metadata associated with different users. Remote storage providers can employ post-process data deduplication or in-line data deduplication. In addition, a data source can perform data deduplication.

As an attempt to secure data, hash values are used to efficiently prove ownership of data since the hash values are substantially smaller than the corresponding data. But these shorter pieces of information, sometimes referred to as fingerprints, have vulnerabilities. The hash functions are publicly known. An attacker can generate numerous hash values with the publicly known hash functions, and feign ownership of a file if any of the generated hash values happen to match a hash value at a remote storage provider. The attacker can use the hash value as proof of ownership and retrieve the entire file.

BRIEF DESCRIPTION OF THE DRAWINGS

The embodiments may be better understood, and numerous objects, features, and advantages made apparent to those skilled in the art by referencing the accompanying drawings.

DESCRIPTION OF EMBODIMENT(S)

The description that follows includes example systems, methods, techniques, instruction sequences and computer program products that embody techniques of the subject matter. However, it is understood that the described embodiments may be practiced without these specific details. For instance, although examples refer to hash trees, embodiments can employ other hash structures that have multiple elements. Examples of other hash structures with multiple elements include a skewed hash tree, a hash chain, a hash list, etc. In other instances, well-known instruction instances, protocols, structures and techniques have not been shown in detail in order not to obfuscate the description.

Storage providers can securely store data and avoid data duplication with secure derivative data and offload the responsibility of generating the secure derivative data to the data owners. Initially, a data source will provide an encrypted version of data and the secure derivative data to a remote storage provider. The secure derivative data comprises data derived from the data to be stored using one or more cryptographic functions. For instance, the secure derivative data can include a hash of the data, a hash of the encrypted version of the data, a hash tree or a Merkle tree generated from the data, and an encrypted version of the key used to encrypt the data. When the remote storage provider later receives a request to store the same data, the remote storage provider challenges the requestor based on the hash tree. A proper response to this challenge proves ownership of the data to the storage provider instead of the hash of the data being proof of ownership. After data ownership is proved, the remote storage provider verifies that the requestor possesses the data using the encrypted key. If data possession is proved, then the requestor can be associated with the previously stored encrypted data without duplicating the encrypted data at the remove storage provider. Throughout the exchange with the remove storage provider, clear data is not transmitted across a wire (i.e., across a network).

Figure 1:
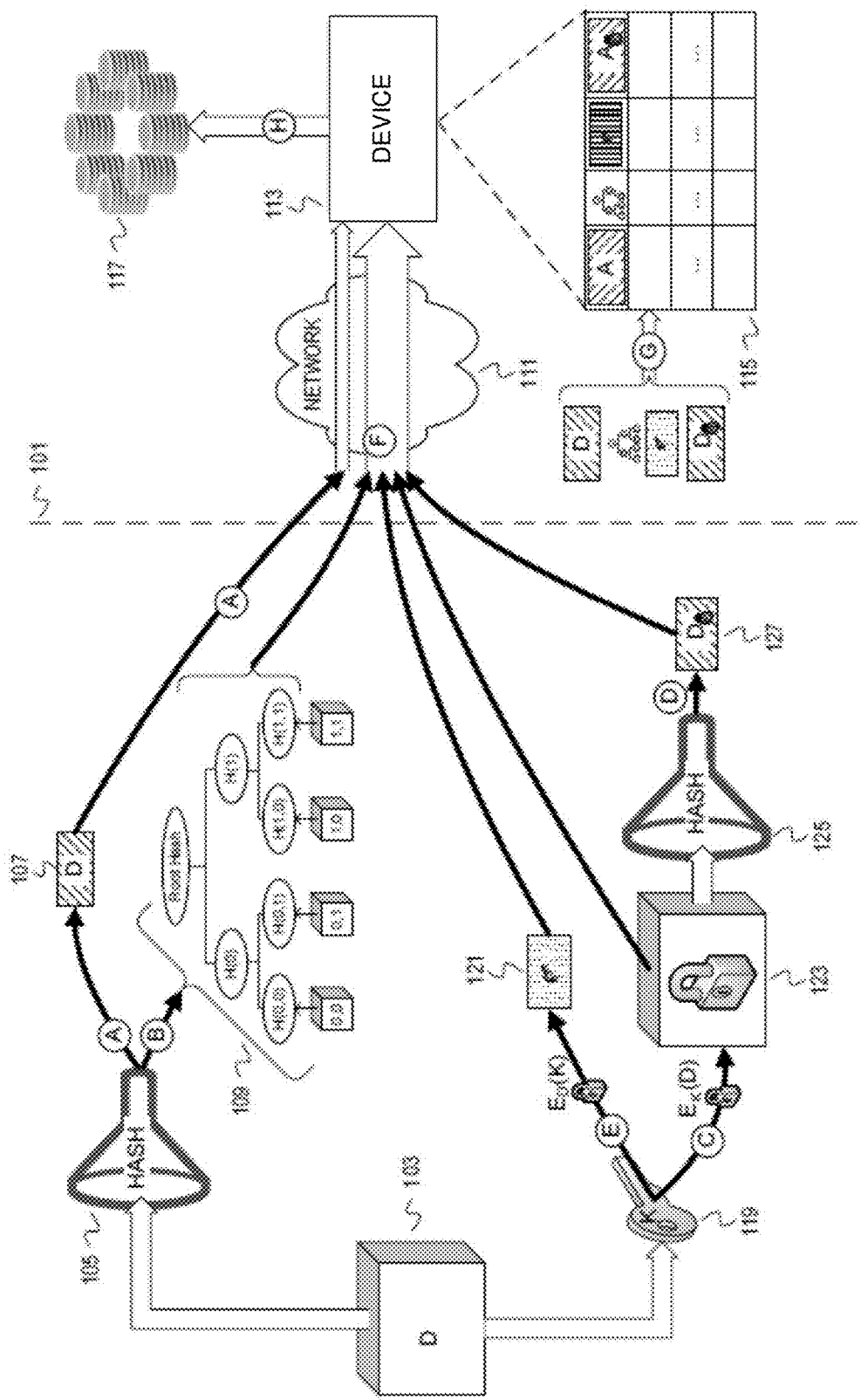
FIG. 1 illustrates an example exchange between a data source and a storage provider that establishes the secure derivative data that are the basis for proof of ownership and data possession.

FIG. 1 illustrates an example exchange between a data source and a storage provider that establishes the secure derivative data that are the basis for proof of ownership and data possession. FIG. 1 depicts a dashed line 101. The dashed line 101 delineates a data source from a storage controller 113. The storage controller 113 performs input/output operations (e.g., reads, writes, put, get, etc.) to storage devices 117. The depicted elements to the left of the dashed line 101 occur at the data source. The data source communicates with the storage controller 113 via a network 111. A series of stages A-H are depicted in FIG. 1 as example stages to help describe the operations that establish the secure derivative data. These stages are not to be used to constrain any claims to specific, discrete time instances. Some of the stages overlap with other stages or persist beyond other stages. In addition, the order of the stages can be different.

At stage A, a message digest 107, also referred to as a data fingerprint, is generated and communicated to the storage controller 113. The data source generates the message digest 107 with data 103 (also identified as 'D') and a hash function 105. Since this example presumes that an encrypted version of the data 103 is not stored in the storage devices 117, then the storage controller 113 will not find the message digest 107 in a table 115 that is accessible to the storage controller 113. The table 115 is referred to as a "table" for simplicity, and can be a different data structure. Each entry of the table 115 indicates the secure derivate data for encrypted data that is stored in the storage devices 117. At this point in this example, the table 115 does not host any of the secure derivate data for the data 103. Since there is no indication that the storage devices 117 host the data 103, the storage controller 113 updates the table 115 to indicate the message digest 107, and then proceeds to obtain an encrypted version of the data 103 and the corresponding secure derivative data.

At stage B, the data source generates a hash tree 109 from the data 103. The data source inputs the data 103 into the hash function 105 to generate the hash tree 109. The hash tree 109 will be provided the storage controller 113 for proof of data ownership.

At stage C, the data source encrypts the data 103. The data source uses an encryption key 119, which is identified in FIG. 1 as 'K'. The encryption of the data 103 is notated in FIG. 1 as $E_K(D)$. The notation indicates that the data (D) 103 is encrypted with the key (K) 119. The encryption of the data 103 with the key 119 generates encrypted data 123. The encrypted data is what will be transmitted to the storage controller 113 for remote storage to avoid exposure of the data 103. Similar to selection of a hash function, no particular encryption algorithm is necessary and can vary between different developers/designers.

At stage D, the data source generates a hash of the encrypted data 123 generated at stage C. The data source inputs the encrypted data 123 into a hash function 125. The hash function 125 generates a message digest 127, which is a hash of the encrypted data 123. Although different hash functions 105, 125 are illustrated, the same hash function can be used to generate the message digest 107 and the message digest 127. The message digest 127 is what will be supplied to the remote storage controller 113 to verify data possession.

At stage E, the data source encrypts the key 119 using the data 103. The data source uses some form of the data 103 to encrypt the key 119. Although the data 103 can be used as the key to encrypt the key 119, the data 103 is likely too large for practical use as an encryption key. Therefore, the data source uses a shorter piece of information that is derived from the data. The shorter piece of information can be another hash generated from a hash function that is different than the hash function 105. The shorter piece of information derived from the data 103 can be an aggregation of samples from the data 103. The encryption of the key 119 is notated in FIG. 1 as $E_{D'}(K)$. The notation indicates that a key (D') based on the data (D) 103 is used to encrypt the key (K) 119. The encryption of the key 119 with the key D' generates encrypted key 121. The encrypted key 121 will be provided to the remote storage controller 113 to verify possession along with the message digest 127.

At stage F, the generated data is transmitted via the network 111 to the storage controller 113. The data source transmits the hash tree 109, the encrypted key 121, the encrypted data 123, and the message digest 127. The data source can transmit all of the data in a single transmit operation, transmit each piece of data in individual transmit operations, transmit the data in a single communication session, transmit the data in different communication sessions, etc.

At stage G, the storage controller 113 updates the table 115 with the secure derivative data. The storage controller 113 updates the table 115 to indicate the hash tree 109, the encrypted key 121, and the message digest 127. This information is keyed or indexed with the message digest 107. At stage H, the remote storage controller writes the encrypted data 123 to the storage devices 117.

Figure 2:
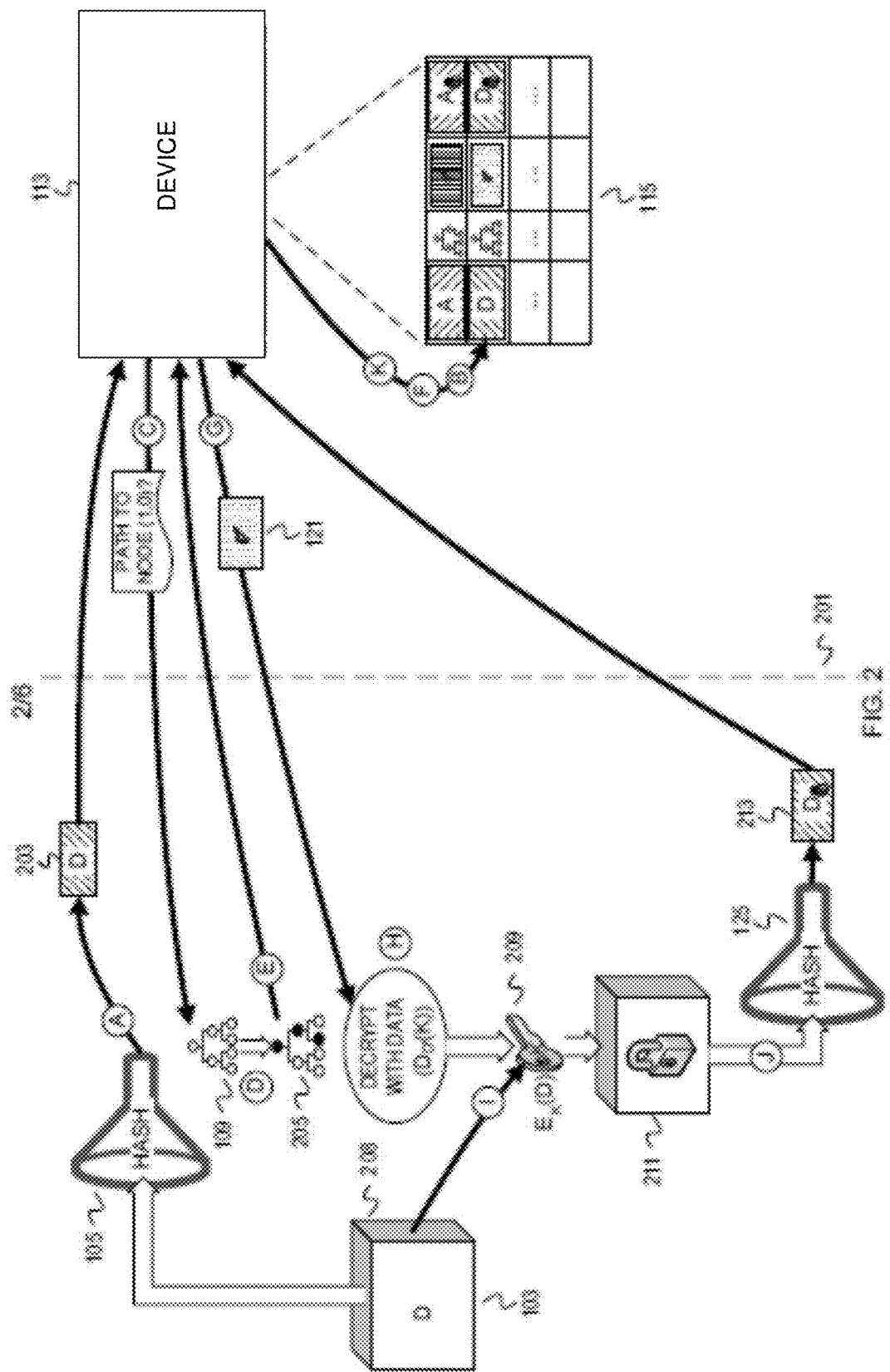
FIG. 2 illustrates an example of using the secure derivative data as proofs of ownership and possession.

When a subsequent request is received by the storage controller 113 to store data, the storage controller uses the table 115 to securely deduplicate data. FIG. 2 illustrates an example of using the secure derivative data as proofs of ownership and possession, which are referred to collectively as proofs of storage. FIG. 2 again depicts the storage controller 113. FIG. 2 also depicts a dashed line 201. The area to the left of the dashed line 201 represents another data source other than the one that initially uploaded the encrypted data 123. The data source of FIG. 2 also has the data 103 and requests remote storage of the data 103 by the storage controller 113. As with FIG. 1, FIG. 2 depicts a series of stages. These example stages to help describe the operations that use the secure derivative data as proofs of ownership and possession. These stages are not to be used to constrain any claims to specific, discrete time instances. Some of the stages overlap with other stages or persist beyond other stages. In addition, the order of the stages can be different.

At stage A, the data source transmits a message digest 203 to the storage controller 113. The data source generated the message digest 203 with the data 103 and the hash function 105. Since the data and the hash function are the same as those in FIG. 1, then the message digest 203 is the same as the message digest 107 of FIG. 1. Transmission of the message digest 203 is coincident with requesting the storage controller to store the data 103.

At stage B, the storage controller 113 locates the message digest 203 in the table 115. The storage controller 113 searches the table 115 for a matching message digest. Since the message digest 203 and the message digest 107 were created with the same data 103 and the same hash function 105, they match.

At stage C, the storage controller 113 challenges the data source based on the hash tree 109 indicated in the table 115. After finding the entry indexed by the message digest 107/203, the storage controller 113 generates a challenge based on the hash tree indicated in the entry, which is the hash tree 109. In this example, the storage controller 113 challenges the data source with the node (1,0). In other words, the storage controller 113 challenges the data source to identify the path through the hash tree 109 to the node (1,0). Since the data source has the data 103 and the hash function 105, the data source can generate (or has already generated) the hash tree 109. In response to the challenge, the data source determines the path corresponding to the node (1,0) at stage D. At stage E, the data source replies to the storage controller 113 with a data path indication 205. As examples, the data path indication can be the hash value of that node (sometimes referred to as label) or hash values of all nodes on the path to the identified node.

At stage F, the storage controller 113 determines whether the proof of ownership challenge has been satisfied. The storage controller 113 determines whether the data path indication 205 is correct. Since the data path indication 205 is correct, the storage controller 113 now sends the data source the encrypted key 121 to verify possession of the data 103 at stage G.

At stage H, the data source decrypts the received encrypted key 121. The data source decrypts the encrypted key 121 using some form of the data 103. In some cases, the data sources that will essentially "share" the remotely stored data are in a same organization. Although different data source (e.g., different users), the data sources in the organization will be aware of what form of the data 103 is being used as a decryption key and encryption key. Indeed, the organization likely already has the keys designated instead of having the organization's data sources generate them on the fly. In other cases, different data sources will be accessing the remote storage through a common program interface and/or client program. That program interface or client program will embody the functions for generating the decryption key based on the data. For example, different users will use a same client program, which will control how keys and hashes are generated. Decryption of the encrypted key 121 yields a key 209, which in this case is the same as the key 119 in FIG. 1.

At stage I, the data source uses the key 209 to encrypt the data 103. This generates encrypted data 211.

At stage J, the data source applies the hash function 125 to the encrypted data 211 to generate the message digest 213. The message digest 213 is then communicated to the storage controller 113.

At stage K, the storage controller 113 accesses the table 115 to determine whether the message digest 213 qualifies as proof of possession of the data 103. The storage controller 103 determines that the entry of the message digest 203/107 indicates a message digest that matches the message digest 213. Once the storage controller 113 has been satisfied with the proofs of ownership and possession, the storage controller 113 performs deduplication and associates the data source with the already stored encrypted version of the data 103.

Figure 3:
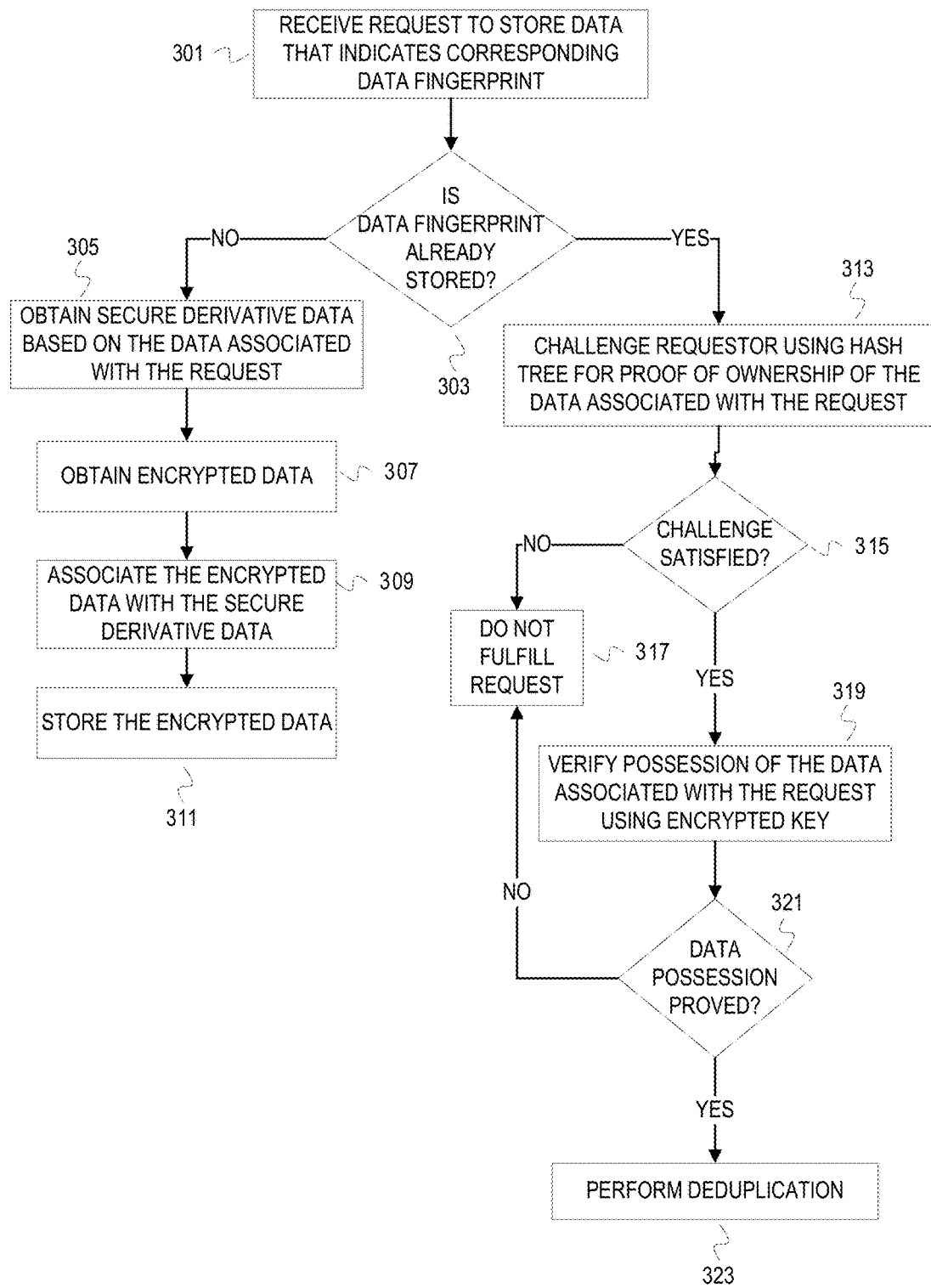
FIG. 3 depicts a flowchart of example operations for using secure derivative data as proofs of ownership and possession for remote storage.

FIG. 3 depicts a flowchart of example operations for using secure derivative data as proofs of ownership and possession for remote storage. FIG. 3 depicts example operations that could be performed by a storage controller that services requests to store data. These example operations will be described with reference to a storage controller, although the moniker of "storage controller" should not be used to limit the claims to a specific device that can perform the operations.

At block 301, a storage controller receives a request to store data. The request indicates a fingerprint generated from the data to be stored. Although unencrypted data could be stored within the context of this disclosure, it is more likely that an encrypted version of the data will be stored for security reasons. Thus, the request to store the data is effectively a request to store the data as encrypted since the data source likely prefers to avoid transmitting the data unencrypted. Therefore, the description of FIG. 3 refers to the data as associated with the request instead of the data requested to be stored.

At block 303, the storage controller determines whether the fingerprint is indicated in a data structure that indicates secure derivative data. The storage controller accesses a data structure that indicates secure derivative data for data stored in storage devices associated with the storage controller. The data structure is keyed or indexed by data fingerprints. If the data structure indicates the data fingerprint of the request, then control flows to block 313. Otherwise, control flows to block 305.

At block 305, the storage controller obtains secure derivative data based on the data associated with the request. If the fingerprint was not indicated in the data structure, then the data associated with the store request is not stored in a storage device associated with the storage controller. The storage controller can communicate with the data source to obtain the secure derivative data in different manners. The storage controller can send a single request for the secure derivative data or request each piece of the secure derivative data from the data source. In addition, the storage controller can implicitly request the secure derivative data by informing the data source that the data associated with the request is not stored.

At block 307, the storage controller obtains the data as encrypted.

At block 309, the storage controller associates the encrypted data with the obtained secure derivative data. The storage controller can associated the encrypted data with the obtained secure derivative data in accordance with different techniques. For example, the storage controller can reference storage location metadata from the data structure that indicates the secure derivative data. As another example, the association can be implicit. For instance, the encrypted data can be associated with the secure derivative data because the secure derivative data is indexed by the data fingerprint and location metadata for the data is also indexed by the data fingerprint.

At block 311, the encrypted data is stored. For instance, the storage controller causes the encrypted data to be written to one or more storage devices (e.g., solid state drives, disk drives, tape drives, etc.).

If the data fingerprint was not indicated by the data structure, then control flowed to block 313. At block 313, the storage controller challenges the requestor that sent the request at block 301 to prove ownership of the data associated with the request. The storage controller challenges the requestor using a hash tree associated with the data fingerprint. For example, the storage controller looks up the hash tree or a reference to the hash tree in the data structure that stores the data fingerprint. The storage controller then selects at least one node of the hash tree. The challenge is for the requestor to identify a characteristic of the hash tree based on the selected node. These illustrations refer to a path through the hash tree to the selected node. But challenges are not limited to paths. Examples of challenges include requesting identification of all nodes at a particular level of the hash tree, requesting identification of a node at a certain position in the hash tree relative to the selected node, requesting identification of all nodes at a certain level of the hash tree, requesting identification of all nodes in a particular branch of the hash tree, etc. The property of the challenge is that a proper response is highly unlikely without the hash tree. Furthermore, the challenge can involve multiple exchanges that increase in complexity until a configured threshold is met or that repeat until a threshold is met. As an example, a first challenge may request identification of a node adjacent to a selected node. A next challenge may request identification of all nodes at particular level and in a particular branch of the hash tree. The threshold for proof of ownership (e.g., number of exchanges, complexity of challenges, etc.) can vary. This threshold can vary based on size of the data, trustworthiness of the data source, a security threshold established by an administrator, etc. Different proof of ownership thresholds can be defined for different data sizes, different security levels, different trust levels, etc. The trust levels and security levels can be established at the storing provider (e.g., cloud provider policy, administrator configuration, etc.).

At block 315, the storage controller determines whether the challenge was satisfied. If it was not satisfied, then control flows to block 317. Otherwise, control flows to block 319.

At block 317, the storage controller does not fulfill the request. This can take various forms. The storage controller can avoid any further processing of the request or communicate a deny message to the requestor. The storage controller can also record information from the request that may identify the requestor and indicate that the requestor failed a proof of ownership challenge.

At block 319, the storage controller verifies possession of the data associated with the request using an encrypted key. The encrypted key is associated with the fingerprint in the data structure. The storage controller transmits the encrypted key to the requestor.

At block 321, the storage controller determines whether a reply from the requestor proves data possession to the storage controller. The requestor returns a message digest in response to the request for data possession verification. The message digest should be a hash of the encrypted version of the data associated with the request. If it is, then possession is verified and control flows to block 323. If possession is not verified, then control flows to block 317.

At block 323, the storage controller performs deduplication. In the case of these example operations, deduplication is implicitly performed since the requestor never sent the encrypted data. Deduplication in this case is avoiding duplication of data instead of marking duplicate data for removal or removing duplicate data. If the requestor sent the encrypted data for storage coincident with the request at block 301, then the storage controller can perform deduplication by marking the encrypted data for removal or removing the encrypted data.

Figure 4:
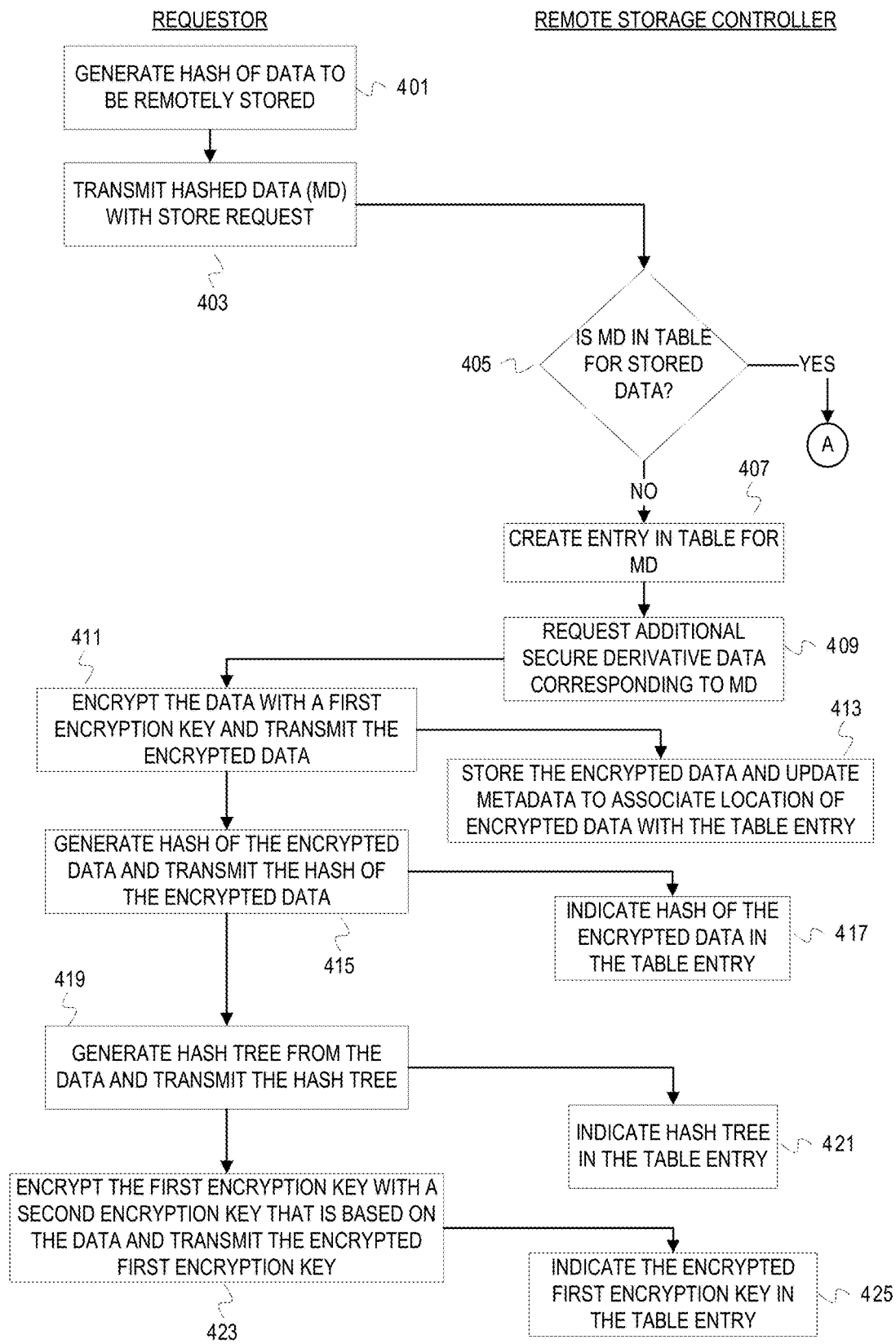
FIGS. 4 and 5 depict flowcharts of example operations for secure data deduplication using secure derivative data at both a data source/requestor and a storage controller.
Figure 5:
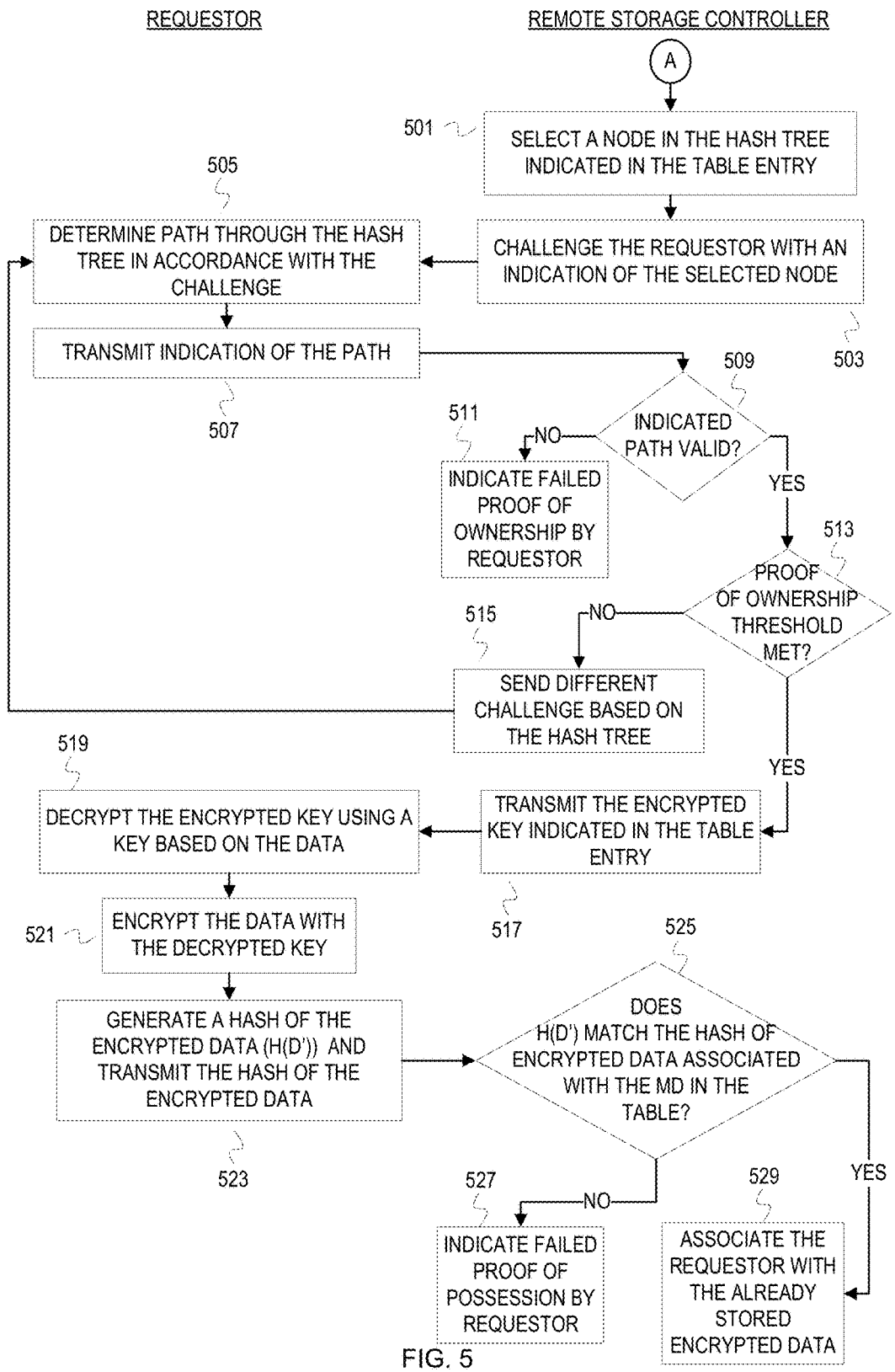

FIGS. 4 and 5 depict flowcharts of example operations for secure data deduplication using secure derivative data at both a data source/requestor and a storage controller. FIG. 4 depicts the example operations when a remote storage controller collects secure derivative data from a requestor.

At block 401, a requestor generates a hash of data to be remotely stored. As explained in FIG. 3, an encrypted version of the data will be likely stored remotely.

At block 403, the requestor transmits the hashed data (MD) with store request. For example, the requestor constructs a request message that indicates the hashed data.

At block 405, a remote storage controller receives the hashed data and determines whether the received hashed data is indicated in a table for stored data. The table associates secure derivate data with corresponding stored data. If the hashed data is indicated in the table, then control flows to FIG. 5. Otherwise, control flows to block 407.

At block 407, the remote storage controller creates an entry in the table for the hashed data.

At block 409, the remote storage controller requests additional secure derivative metadata corresponding to the hashed data that was received by the remote storage controller. As mentioned previously, the remote storage controller can make a single request or multiple requests.

At block 411, the requestor encrypts the data with a first encryption key and transmits the encrypted data to the remote storage controller.

At block 413, the remote storage controller stores the encrypted data and updates storage metadata to associate the location of the encrypted data with the table entry. This association can take many forms that may vary depending upon the organization of data. For example, a file identifier can be indicated in or referenced by the table entry. The table entry can reference a root inode for a file. As another example, the hashed data or data fingerprint can reference a container of the secure derivative data and the storage metadata.

At block 415, the requestor generates a hash of the encrypted data and transmits the hash of the encrypted data to the remote storage controller.

At block 417, the remote storage controller indicates the hash of the encrypted data in the table entry.

At block 419, the requestor generates a hash tree from the data and transmits the hash tree to the remote storage controller.

At block 421, the remote storage controller indicates the hash tree in the table entry.

At block 423, the requestor encrypts the first encryption key with a second encryption key. The second encryption key is based on the data. As mentioned previously, the second encryption key can be a value that uniquely (or nearly uniquely) identifies the data and is smaller than the data. In some cases, the data itself can be the second encryption key. In cryptography, an encryption key has a corresponding decryption key. Thus, the decryption key that corresponds to the second encryption key will also be based on the data. The requestor transmits the encrypted first encryption key to the remote storage controller. At block 425, the remote storage controller indicates the encrypted first encryption key in the table entry.

FIG. 5 depicts the example operations when using the secure derivative data for proofs of ownership and possession. Control flowed to FIG. 5 from FIG. 4 if the remote storage controller determined that the hashed data of the request was not in the table.

At block 501, the remote storage controller selects a node in the hash tree indicated in the table entry of the hashed data. As stated earlier, challenges for proof of ownership can vary. Multiple nodes can be selected for the challenge. For simplicity, these example operations refer to a single node for the challenge.

At block 503, the remote storage controller challenges the requestor with an indication of the selected node. For instance, the remote storage controller sends a message that requests identification of a path to a node.

At block 505, the requestor determines a path through the hash tree in accordance with the challenge. If the requestor does not have the hash tree, then the requestor may not respond.

At block 507, the requestor transmits an indication of the path. The indication of the path can take various forms. The challenge can specify how the path should be indicated. For example, the challenge can specify that the path should be indicated with an array of the labels or values of the nodes on the path. As another example, the challenge can specify that the path should be indicated with an array of positions of the nodes on the path. In some cases, the format of the challenge and challenge response are predefined. For instance, client code may specify how a challenge response will be constructed.

At block 509, the remote storage controller 509 determines whether the indicated path is valid. If the indicated path is not valid, then control flows to block 511. If the indicated path is valid, then control flows to block 513.

At block 511, the remote storage controller indicates that the requestor failed to prove ownership. This indication of failure by the requestor can range from merely not responding to the requestor any further to recording information about the requestor for investigative purposes in case the requestor is an attacker.

At block 513, the remote storage controller determines whether a proof of ownership threshold has been met. The remote storage controller may be configured to require successful response to 3 challenges or 85% of challenges. A more lax threshold, for example a percentage based threshold, may be used to account for network failures or data corruption. If the indicated path is valid and the threshold has not yet been met, then control flows to block 515. Otherwise, control flows to block 517.

At block 515, the remote storage controller sends a different challenge to the requestor based on the hash tree. For example, the different challenge may be a request for path identification for a different node. Control flows from block 515 back to block 505.

At block 517 after the proof of ownership threshold has been met, the remote storage controller transmits the encrypted key indicated in the table entry.

At block 519, the requestor decrypts the encrypted key using the key based on the data of the store request.

At block 521, the requestor encrypts the data of the store request with the decrypted key.

At block 523, the requestor generates a hash of the encrypted data, which is notated in FIG. 5 as H(D'). The requestor then transmits the hash of the encrypted data to the remote storage controller.

At block 525, the remote storage controller determines whether the hash of the encrypted data received from the requestor matches the hash of encrypted data in the table entry. If so, then control flows to block 529. If there is no match, then control flows to block 527.

At block 529, the remote storage controller associates the requestor with the already stored, encrypted data. For example, the remote storage controller associates an identifier of the data used by the requestor with the hash of the data.

At block 527, the remote storage controller indicates that the requestor failed the proof of possession.

The flowcharts depicted herein are for illustrative purposes to aid in understanding this disclosure, and should not be used to limit any claims. Additional operations or fewer operations than those depicted can be performed. Further, the depicted operations can occur in a different order, in parallel, etc. With reference to FIG. 3, the order of operations of blocks 305 and 307 can be reversed or in parallel. The order in which secure derivative data is generated can be in a different order in parallel, and how the secure derivative data is communicated can vary. As an example, a requestor and a storage controller can exchange message for each piece of secure derivative data that the storage controller collects. After a data fingerprint is initially transmitted to the storage controller, the storage controller can send back a request for additional derivative data if the fingerprint is not found. As another example, a data source can initially send multiple pieces of the secure derivative data after sending the fingerprint. If a storage controller determines that the fingerprint is present after the request has already begun to transmit the secure derivative data, then the storage controller can send a message to the requestor to cancel the transfer of the other derivative data.

Although the description refers to hash functions, other one-way functions that generate a smaller data from larger data with collision resistance can be used. In addition, a variety of cryptographic hash functions can be used: the various SHA, the various MD, Tiger Hash, Whirlpool hash, etc.

As mentioned earlier, the scope of the claims should not be limited to hash trees even though hash trees are used in the description. The challenge is based on a multiple element structure generated from a hash function. Typically, the root of the structure is used. In our case, the structure (or at least more than the root) is used for proof of ownership. If a structure other than a hash tree is used (e.g., hash chain, hash list, etc.). Then a challenge for proof of ownership can be based on an element within the structure other than a first element or root element that is usually provided as the output of the hash function.

This description uses the term "storage controller" to refer to any entity within a storage system that manages access to data. But entities within a storage system ("storage elements") can be either or both of a storage controller and a storage device. The distinction between a storage controller and a storage device arises from the primary functionality of the storage element. A storage controller primarily manages access to storage devices. Storage controllers process requests from other devices (e.g., clients) and can originate requests to perform operations (e.g., snapshot operations). Regardless of whether the request is from another device or originates from the storage controller, the storage controller transmits a request to a storage device. An example of a storage controller is a file server. A storage device primarily performs operations that ultimately fulfill requests from the perspective of the storage controller. A storage device performs a read of or a write to a location specified by a request from a storage controller. This read or write may be performed on a storage medium or multiple storage mediums. In the case of multiple layers of virtualization, the read or write may be performed on what appears to be a medium or mediums from the perspective of the storage controller. Examples of a storage device include a disk drive, an optical drive, a storage array, s solid stage device, and a tape drive.

The terms storage controller and storage device are used based on the primary functionality of a storage element because functionality is not exclusive between the elements. For instance, a storage controller may have data locally stored in cache to expedite handling of access requests. Even though the storage controller can fulfill access requests, the primary functionality of the storage controller is not to read data from and write data to local memory. Similarly, a storage device can include hardware that manages access to storage media. For instance, a redundant array of independent disks (RAID) controller and an array of disks can be housed within a single enclosure. Although the RAID controller manages access to the array of disks, the primary functionality of the components housed within that single enclosure is to fulfill requests received from a storage controller.

As will be appreciated by one skilled in the art, aspects of the disclosure may be implemented as a system, method or computer program product. Accordingly, aspects of the disclosure may take the form of a hardware aspect, a software aspect (including firmware, resident software, micro-code, etc.) or an aspect combining software and hardware aspects that may all generally be referred to herein as a "circuit," "module" or "system." Furthermore, aspects of the disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, an electromagnetic signal, an optical signal, an infrared signal, or any suitable combination thereof. A computer readable signal medium may be any computer readable medium that is not a computer readable storage medium and that can communicate, propagate, or transport a program for use by or in connection with a computer. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone computer, may execute in a distributed manner across multiple computers, and may execute on one computer while providing results and or accepting input on another computer.

Aspects of the disclosure are described with reference to flowchart illustrations and/or block diagrams of methods, apparatus (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
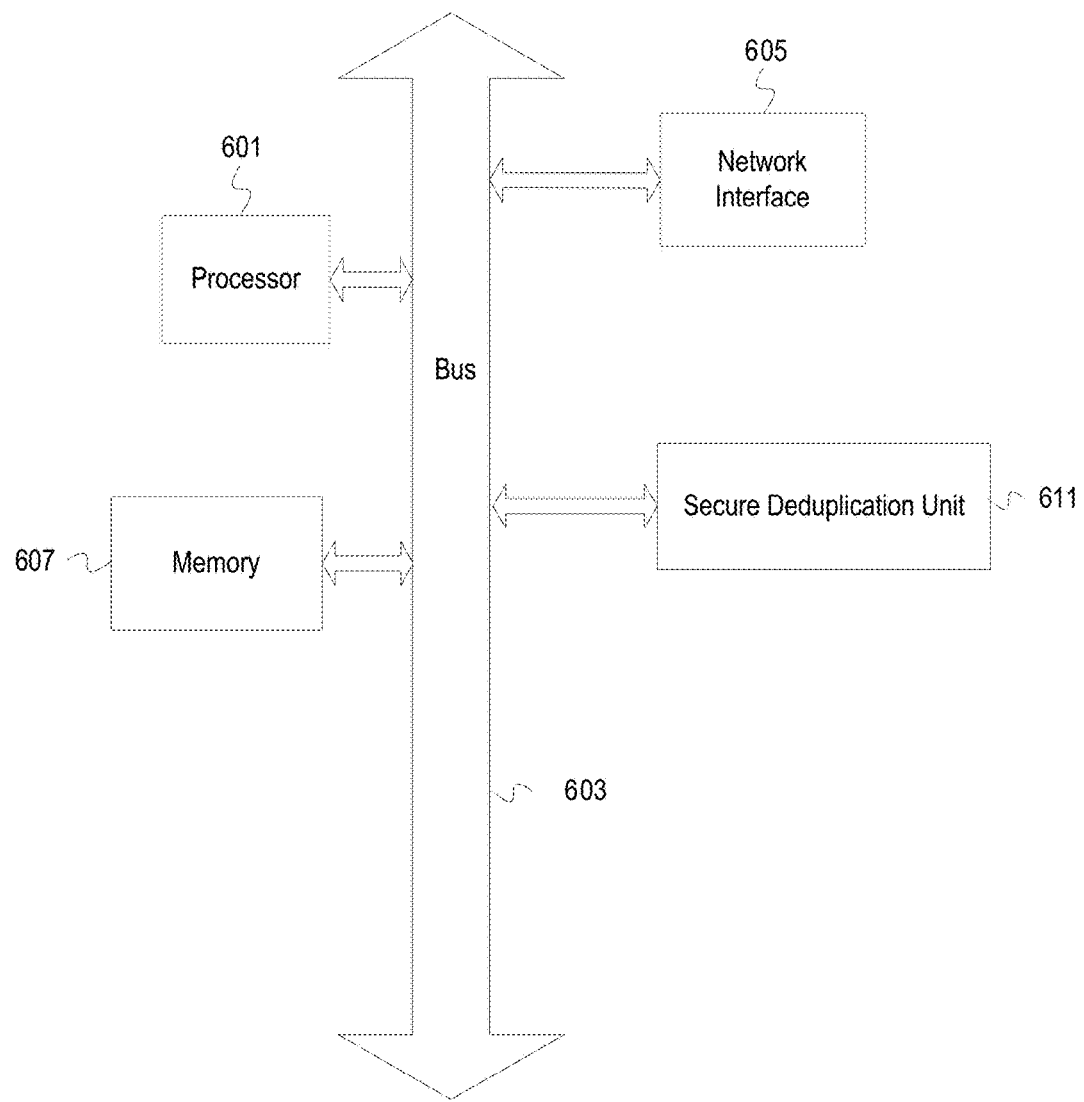
FIG. 6 depicts an example computer system with a secure deduplication unit.

FIG. 6 depicts an example computer system with a secure deduplication unit. A computer system includes a processor unit 601 (possibly including multiple processors, multiple cores, multiple nodes, and/or implementing multi-threading, etc.). The computer system includes memory 607. The memory 607 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 603 (e.g., PCI, ISA, PCI-Express, HyperTransport® bus, InfiniBand® bus, NuBus, etc.), a network interface 605 (e.g., an ATM interface, an Ethernet interface, a Frame Relay interface, SONET interface, wireless interface, etc.), and a storage device(s) 609 (e.g., optical storage, magnetic storage, etc.). The system also includes a secure deduplication unit 611 that is coupled to the bus 603. The secure deduplication unit collects secure derivative data that can be used for proofs of ownership and proofs of possession. Any one of these functionalities may be partially (or entirely) implemented in hardware and/or on the processing unit 601. For example, the functionality may be implemented with an application specific integrated circuit, in logic implemented in the processing unit 601, in a coprocessor on a peripheral device or card, etc. Further, realizations may include fewer or additional components not illustrated in FIG. 6 (e.g., video cards, audio cards, additional network interfaces, peripheral devices, etc.). The processor unit 601, the storage device(s) 609, and the network interface 605 are coupled to the bus 603. Although illustrated as being coupled to the bus 603, the memory 607 may be coupled to the processor unit 601.

While the embodiments are described with reference to various implementations and exploitations, it will be understood that these embodiments are illustrative and that the scope of the subject matter is not limited to them. In general, techniques for secure data deduplication as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the subject matter. In general, structures and functionality presented as separate components in the example configurations may be implemented as a combined structure or component. Similarly, structures and functionality presented as a single component may be implemented as separate components. These and other variations, modifications, additions, and improvements may fall within the scope of the subject matter.

Use of the phrase "at least one of . . . or" should not be construed to be exclusive. For instance, the phrase "X comprises at least one of A, B, or C" does not mean that X comprises only one of {A, B, C}; it does not mean that X comprises only one instance of each of {A, B, C}, even if any one of {A, B, C} is a category or sub-category; and it does not mean that an additional element cannot be added to the non-exclusive set (i.e., X can comprise {A, B, Z}).

What is claimed is:

1. A method for data deduplication comprising:
receiving a request from a requestor to store data;
querying a data structure, of fingerprints corresponding to locally stored secure derivative data, to determine whether a fingerprint of the data is stored within the data structure;
when the fingerprint is not found within the data structure:
storing an encryption of the data; and
inserting the fingerprint into the data structure; and
when the fingerprint is found within the data structure:
communicating a challenge to the requestor, wherein the challenge is based on a portion of a hash tree generated from the data;
after receiving a successful response to the challenge, communicating an encrypted security key to the requestor;
after receiving a hash value from the requestor in response to communicating the encrypted security key, determining whether the hash value from the requestor matches a hash value generated from the encryption of the data;

when the hash value from the requestor matches the hash value generated from the encryption of the data, determining that the requestor is verified as having possession of the data; and upon verifying possession of the data by the requestor, performing deduplication for the request.

2. The method of claim 1, further comprising associating an indication of the requestor with the encryption of the data when the hash value from the requestor matches the hash value generated from the encryption of the data.

3. The method of claim 1, further comprising determining that a response from the requestor is the successful response when the response correctly identifies an element in the hash tree.

4. The method of claim 1, further comprising recording an indication of the requestor when the hash value from the requestor does not match the hash value generated from the encryption of the data.

5. The method of claim 1,
wherein communicating the challenge comprises requesting that the requestor identify a plurality of elements of the hash tree; and
wherein the successful response comprises correct identification of the plurality of elements of the hash tree.

6. The method of claim 5, wherein requesting that the requestor identify the plurality of elements comprises serially requesting that the requestor identify each of the plurality of elements.

7. The method of claim 5, further comprising determining a proof of ownership threshold, wherein the challenge is based on the proof of ownership threshold.

8. The method of claim 7, wherein the proof of ownership threshold is based on a size of the data.

9. A non-transitory machine-readable medium having stored thereon machine executable code which when executed by at least one machine, causes the machine to:
receive a request to store data from a requestor;
query a data structure, of fingerprints corresponding to locally stored secure derivative data, to determine whether a fingerprint of the data is stored within the data structure;
when the fingerprint is not found within the data structure:
store an encryption of the data; and
insert the fingerprint into the data structure; and
when the fingerprint is found within the data structure:
communicate a challenge to the requestor, wherein the challenge is based on a portion of a multiple element hash structure generated from the data;
communicate an encrypted security key to the requestor after receipt of a successful response to the challenge;
determine whether a hash value from the requestor matches a hash value generated from the encryption of the data;
when the hash value from the requestor matches the hash value generated from the encryption of the data, determine that the requestor is verified as having possession of the data; and
upon verifying possession of the data by the requestor, perform deduplication for the request.

10. The non-transitory machine-readable medium of claim 9, wherein the machine executable code causes the machine to associate an indication of the requestor with the encryption of the data when the hash value from the requestor matches the hash value generated from the encryption of the data.

11. The non-transitory machine-readable medium of claim 9, wherein the machine executable code causes the machine to determine that a response from the requestor is the successful response when the response correctly identifies an element in the multiple element hash structure.

12. The non-transitory machine-readable medium of claim 9, wherein the machine executable code causes the machine to record an indication of the requestor when the hash value from the requestor does not match the hash value generated from the encryption of the data.

13. The non-transitory machine-readable medium of claim 9,
wherein the requestor is requested to identify a plurality of elements of the hash tree; and
wherein the successful response comprises a correct identification of the plurality of elements of the multiple element hash structure.

14. The non-transitory machine-readable medium of claim 13, wherein the machine executable code causes the machine to to serially request that the requestor identify each of the plurality of elements.

15. The non-transitory machine-readable medium of claim 13, wherein the machine executable code causes the machine to determine a proof of ownership threshold, wherein the challenge is based on the proof of ownership threshold.

16. A computing device comprising:
a memory containing machine-readable medium comprising machine executable code having stored thereon instructions for performing a method of data deduplication; and
a processor coupled to the memory, the processor configured to execute the machine executable code to cause the processor to:
receive a request to store data from a requestor;
query a data structure, of fingerprints corresponding to locally stored secure derivative data, to determine whether a fingerprint of the data is stored within the data structure;
when the fingerprint is not found within the data structure:
store an encryption of the data; and
insert the fingerprint into the data structure; and
when the fingerprint is found within the data structure:
communicate a challenge to the requestor,
wherein the challenge is based on a portion of a multiple element hash structure generated from the data;
communicate an encrypted security key to the requestor after receipt of a successful response to the challenge;
determine whether a hash value from the requestor matches a hash value generated from the encryption of the data;
when the hash value from the requestor matches the hash value generated from the encryption of the data, determine that the requestor is verified as having possession of the data; and
upon verifying possession of the data by the requestor, perform deduplication for the request.

17. The computing device of claim 16, wherein the machine executable code causes the processor to associate an indication of the requestor with the encryption of the data when the hash value from the requestor matches the hash value generated from the encryption of the data.

18. The computing device of claim 16, wherein the machine executable code causes the processor to determine that a response from the requestor is the successful response when the response correctly identifies an element in the multiple element hash structure.

19. The computing device of claim 16, wherein the machine executable code causes the processor to record an indication of the requestor when the hash value from the requestor does not match the hash value generated from the encryption of the data.

20. The computing device of claim 16, wherein the machine executable code causes the processor to:
   request that the requestor identify a plurality of elements of the hash tree, wherein the successful response comprises a correct identification of the plurality of elements of the multiple element hash structure.

* * * * *